United States Patent [19]

James

[11] 4,313,729
[45] Feb. 2, 1982

[54] ADJUSTABLE MOUNT FOR A BELT IDLER PULLEY

[75] Inventor: Larry R. James, Olathe, Kans.

[73] Assignee: Allis-Chalmers Corporation, Milwaukee, Wis.

[21] Appl. No.: 134,187

[22] Filed: Mar. 26, 1980

[51] Int. Cl.³ .............................................. F16H 7/12
[52] U.S. Cl. .................................... 474/135; 248/665
[58] Field of Search ............... 474/114, 115, 117, 135, 474/122, 138, 139, 113, 126; 248/665; 411/222

[56] References Cited

U.S. PATENT DOCUMENTS 2,110,439  3/1938  Gordon ................................ 474/135
4,011,767  3/1977  Nelson ................................ 474/135
4,145,934  3/1979  Sragal ................................. 474/135

Primary Examiner—C. J. Husar
Assistant Examiner—Conrad Berman
Attorney, Agent, or Firm—Charles L. Schwab

[57] ABSTRACT

A belt idler pulley support arm (32) is mounted on a support wall by a pivot structure (48) whose position is determined by three individually adjustable mounting members (71, 72, 73). The mounting members (71, 72, 73) for the pivot structure (48) are accessible for adjustment from the side of the pivot structure remote from the support wall (46) and adjustments may be made while the belt (36) is running thereby allowing a very accurate alignment of the idler pulley (31) with the belt (36).

5 Claims, 4 Drawing Figures

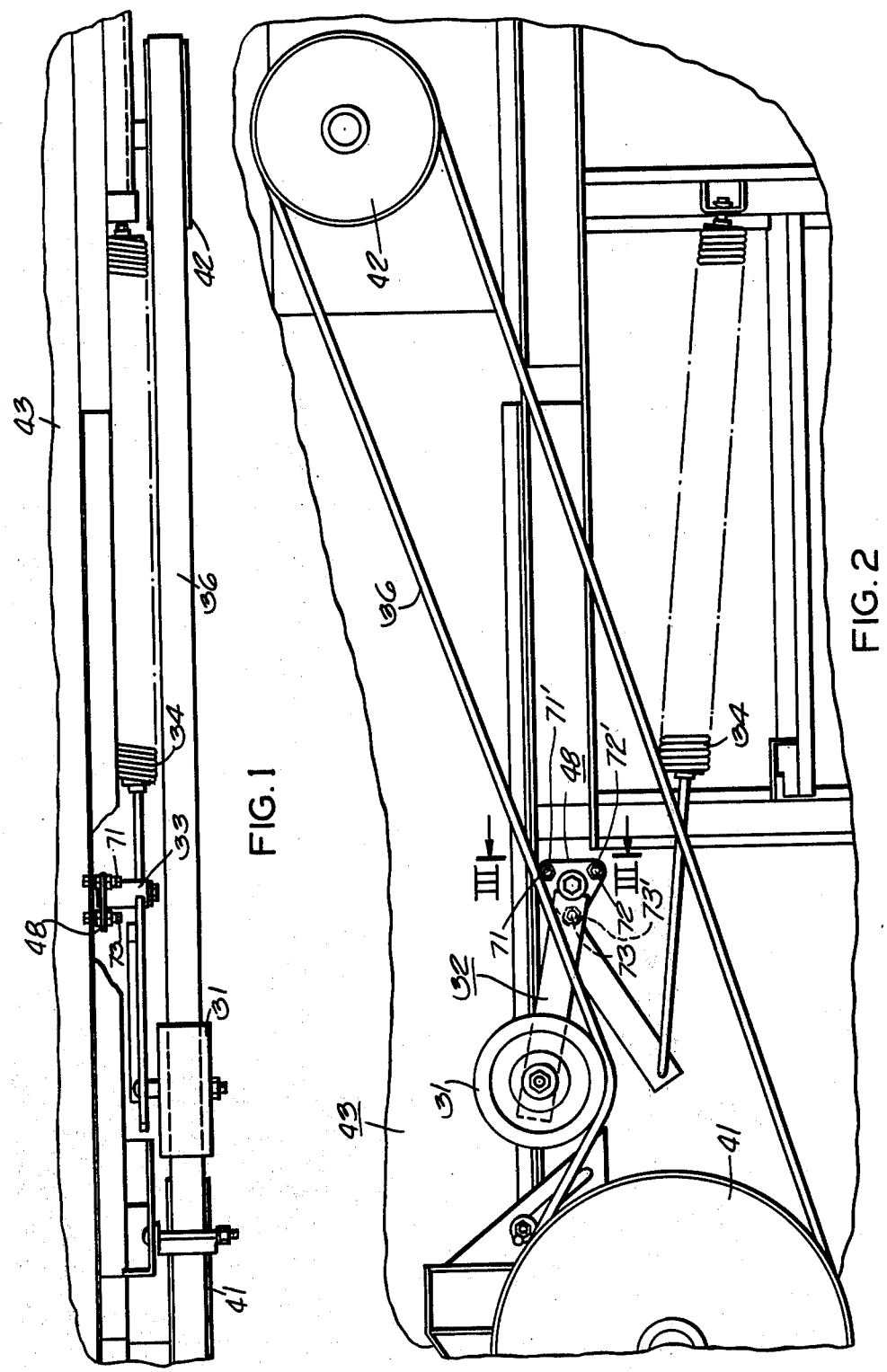

ADJUSTABLE MOUNT FOR A BELT IDLER PULLEY

BACKGROUND OF THE INVENTION

Proper alignment of a power transmitting belt and its belt idler is important to the life of the drive components, particularly the belt. Historically, spring loaded idlers have presented alignment problems. Typically, the construction of such spring loaded idlers includes an idler pulley rotatably mounted on an arm which is spring loaded to provide proper belt tension. The misalignment of the idler pulley in relation to the belt may occur for a variety of reasons including warpage in welding components and buildup of manufacturing tolerances. Two prior art arrangements for adjusting the alignment of a belt idler pulley are shown in U.S. Pat. No. 4,011,767. The present invention is an improvement over the prior art illustrated in FIGS. 1 and 2 of the beforementioned patent.

BRIEF DESCRIPTION OF THE INVENTION

In the present invention, an adjustable mount is provided for supporting a belt idler pulley on a support wall so that it may be aligned with its associated belt. The adjustable mount includes an idler pulley mounting structure which is adjustably secured to the support wall by means including a threaded portion formed on the support wall, a threaded mounting member in threaded engagement with the threaded portion of the support wall and extending through an opening in the idler pulley mounting structure. The adjustable mounting member includes a radially outward extending shoulder in engagement with the mounting structure and a threaded exterior portion on the side of the shoulder remote from the support wall. The mounting structure is secured against the shoulder by a lock nut in threaded engagement with the threaded exterior portion of the adjustable mounting member. The adjustable mounting member also has a wrench receiving portion on its end remote from the wall.

The mounting structure may include an arm rotatably supporting the idler pulley and a pivot structure pivotally supporting the arm. Three parallel, threaded studs may be secured to and extended from the support wall and three adjustable mounting members may extend through three openings in a flanged portion of the pivot structure. The mounting members may include an internally threaded part in threaded engagement with the threaded studs and an externally threaded part for receiving a lock nut. The use of three adjustable mounting members not only permits translational adjustment of the idler pulley through equal adjustment of each mounting member, but also permits an angular adjustment of the idler pulley in relation to the support wall and its associated belt.

BRIEF DESCRIPTION OF THE DRAWINGS

FIG. 1 is a top view of a spring loaded belt idler in which the present invention is incorporated;

FIG. 2 is a side view of the belt idler shown in FIG. 1;

DETAILED DESCRIPTION OF THE DRAWINGS

Figure 3:
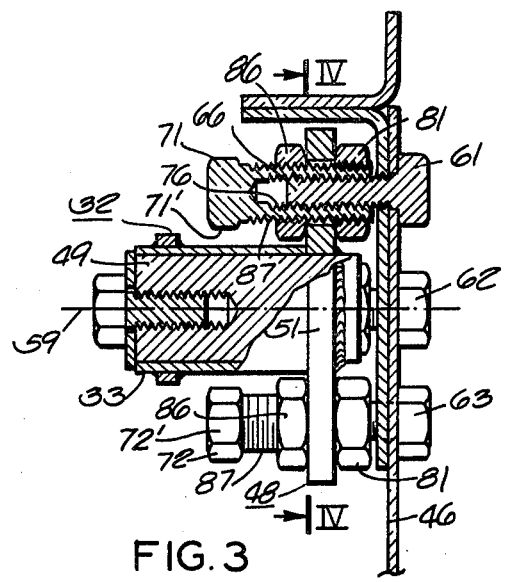
FIG. 3 is a view taken along the line III—III in FIG. 2.
Figure 4:
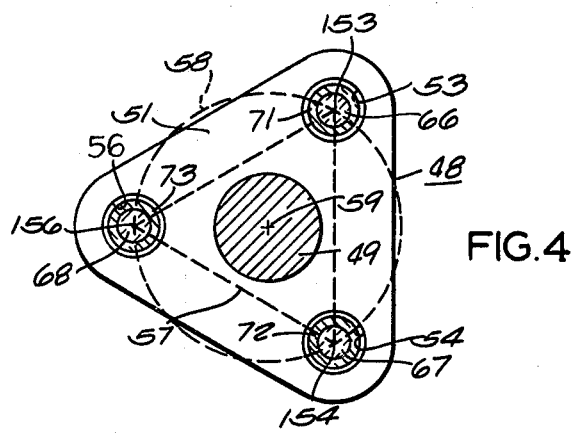
FIG. 4 is a view taken along the line IV—IV of FIG. 3.

Referring to FIGS. 1 and 2, a belt idler pulley 31 is rotatably connected to the free end of an idler arm 32 which includes a cylindrical bearing bushing 33 at its other end. A coil spring 34 maintains the idler pulley in tensioning engagement with a drive belt 36. The drive belt 36 is a V-belt which cooperatively engages a pair of V-grooved pulleys 41, 42 on machinery such as a combine harvester 43. Referring also to FIGS. 3 and 4, the support arm 32 for the belt idler pulley 31 is adjustably mounted on the sidewall 46 of the harvester by an adjustable mount which includes a pivot structure 48 comprised of a cylindrical bearing or pivot portion 49 secured as by welding to a plate-like flange portion 51 which is normal to the pivot portion 49. The flange portion 51 presents round openings 53, 54, 56 the axes 153, 154, 156 of which define apexes of an imaginary triangle shown by dash lines 57 and also define an imaginary circle shown by dash lines 58 encompassing the pivot portion 49. The pivot portion 49 rotatably supports the idler arm 32 about a pivot axis 59 which is disposed in a generally normal position in relation to the wall 46. Three cap screws 61, 62, 63 are rigidly secured by a suitable bonding material to the wall 46 so as to present thre parallel threaded studs 66, 67, 68 in spaced relation to one another and extending outwardly from the wall 46. The threaded studs 66, 67, 68 register with the openings 53, 54, 56 of the flange 51 of the pivot structure 48 and thus can also be viewed as also defining the imaginary triangle 57 and circle 58.

The adjustable mounts include three adjustable sleeve-like mounting members 71, 72, 73 each of which have a threaded cavity or bore 76 in threaded engagement with threaded studs 66, 67, 68. The adjustable mounting members 71, 72, 73 each have a nut 81 rigidly bonded to an exteriorly threaded end of the sleeve-like member by a suitable adhesive. The nuts 81 are in effect radially extending, annular flanges on the adjustable mounting members 71, 72, 73 and form abutments in axial thrust transmitting engagement with the side of the flange 51 confronting the wall 46. Lock nuts 86 are in threaded engagement with the exterior threads 87 of the adjustable mounting members 71, 72, 73 and are in axial thrust transmitting engagement with the side of the flange 51 remote from the wall 46.

A translational adjustment of the idler pulley 31 may be effected by loosening the lock nuts 86, turning the members 71, 72, 73 an equal amount in the same direction and then retightening the lock nuts. The idler pulley 31 may be angularly adjusted by adjusting the members 71, 72, 73 unequal amounts. The wrench-receiving portions 71; 72; 73; of the members 71, 72, 73 and the lock nuts 86 are accessible from the outer side of the harvester and if necessary can be adjusted while the belt is running. Although adjustment of the idler while the belt is running is not recommended because of safety considerations there may be instances where proper adjustment of the idler is not easily achieved except under operating conditions.

The embodiments of the invention in which an exclusive property or privilege is claimed are defined as follows:

1. A mechanism for adjustably mounting a belt idler pulley on a support wall characterized by
    a mounting structure supporting said belt idler pulley presenting an opening and means adjustable securing said mounting structure to said support wall including a threaded stud nonrotatably secured to and extending from said support wall, an adjustable sleeve-like mounting member extending respectively through said opening in said mounting structure and having a threaded cavity extending from one end of said member and in threaded engagement with said threaded stud, a threaded exterior portion concentric with said threaded cavity, shoulder means fixed on said one end of said member in abutting relation to said mounting structure to limit movement of the latter in the direction toward said support wall, and a wrench-receiving portion on the other end of said member, and a lock nut in threaded engagement with said threaded exterior of said member and operable to exert thrust against mounting structure in the direction toward said support wall.

2. The combination of claim 1 wherein said shoulder means is a radially extending annular flange encompassing and concentric to said threaded cavity.

3. An adjustable mount for a belt idler pulley characterized by a support wall presenting three threaded portions defining points of a triangle, a pivot structure having a cylindrical pivot portion and a flange portion normal to said pivot portion presenting three openings registering, respectively, with said threaded portions of said support wall, an idler arm rotatably supported at one end on said pivot portion and rotatably supporting said belt idler pulley on its free end, three adjustable mounting members extending respectively through said openings in said flange, each member having a threaded part in threaded engagement with a respective one of said threaded portions of said support shoulder means fixed on said member in axial thrust transmitting engagement with one side of said flange portion, an externally threaded segment concentric with said threaded part and spaced from said shoulder means in the direction away from said support wall, and a wrench-receiving portion on the other end of said member, and a lock nut in threaded engagement with said threaded segment of said member and in axial thrust transmitting engagement with the other side of said flange portion.

4. A mechanism for adjustably mounting a belt idler pulley on a support wall characterized by three threaded studs nonrotatably secured to and extending from said support wall in parallel relation to one another and defining a circle about which they are circumferentially spaced, a pivot structure having a cylindrical pivot portion and a flange portion normal to said pivot portion presenting three openings spaced radially from said pivot portion and registering, respectively, with said threaded studs an idler arm rotatably supported at one end on said pivot portion and rotatably supporting said belt idler pulley on its free end, three adjustable sleeve-like mounting members extending respectively through said opening in said flange, each member having a threaded bore extending from one end of said member and in threaded engagement with one of said threaded studs, a threaded exterior portion concentric with said threaded bore, shoulder means fixed on said one end of said member in encompassing relation to said threaded bore and in axial thrust transmitting engagement with one side of said flange portion, and a wrench receiving portion on the other end of said member, and a lock nut in threaded engagement with said threaded exterior portion of said member and in axial thrust transmitting engagement with the other side is said flange portion.

5. An adjustable mount for a belt idler pulley characterized by a support wall presenting a threaded portion, a mounting structure supporting said belt idler pulley presenting an opening and means adjustably securing said mounting structure to said support wall including an adjustable sleeve-like mounting member extending respectively through said opening in said mounting structure and having a threaded part in threaded engagement with said threaded portion of said support, a threaded exterior portion, shoulder means fixed on said member in abutting relation to said mounting structure to limit movement of the latter in the direction toward said support wall, and a wrench-receiving portion on the other end of said member, and a lock nut in threaded engagement with said threaded exterior portion of said member and operable to exert thrust against said mounting structure in the direction toward said support wall.

* * * * *